United States Patent
Kuroda et al.

(10) Patent No.: US 8,435,667 B2
(45) Date of Patent: May 7, 2013

(54) ASSEMBLED BATTERY, MANUFACTURING METHOD OF THE SAME, AND VEHICLE PROVIDED WITH ASSEMBLED BATTERY

(75) Inventors: Akira Kuroda, Toyota (JP); Sachio Takeda, Toyota (JP); Yasuhiko Sakai, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 437 days.

(21) Appl. No.: 12/444,004

(22) PCT Filed: Oct. 23, 2007

(86) PCT No.: PCT/IB2007/003170
§ 371 (c)(1),
(2), (4) Date: Apr. 2, 2009

(87) PCT Pub. No.: WO2008/050211
PCT Pub. Date: May 2, 2008

(65) Prior Publication Data
US 2010/0099023 A1   Apr. 22, 2010

(30) Foreign Application Priority Data
Oct. 23, 2006   (JP) .................................. 2006-287646

(51) Int. Cl.
*H01M 6/42* (2006.01)
*H01M 6/00* (2006.01)
(52) U.S. Cl.
USPC .......................................... 429/159; 29/623.1
(58) Field of Classification Search .................. 429/159; 29/623.1
See application file for complete search history.

(56) References Cited

U.S. PATENT DOCUMENTS

| 5,695,891 A | 12/1997 | Misra et al. |
| 7,722,984 B2 * | 5/2010 | Kim et al. ..................... 429/176 |

(Continued)

FOREIGN PATENT DOCUMENTS

| EP | 0 657 952 A1 | 6/1995 |
| JP | 9-199179 | 7/1997 |

(Continued)

OTHER PUBLICATIONS

Office Action (Notification of Reasons for Refusal) issued Dec. 11, 2008, in Japanese Appln. No. 2006-287646.

(Continued)

*Primary Examiner* — Karie O'Neill Apicella
(74) *Attorney, Agent, or Firm* — Finnegan, Henderson, Farabow, Garrett & Dunner, LLP

(57) ABSTRACT

In an assembled battery (10), a plurality of rechargeable unit cells (12), each of which is provided with an electrode body (30) that has a positive electrode (32) and a negative electrode (34), a container (14) that houses the electrode body (30) and an electrolyte, and a positive electrode terminal (15) and a negative electrode terminal (16) which are arranged on an outside of the container (14), the rechargeable unit cells being connected in series. The plurality of unit cells (12) are arranged in a predetermined direction and fastened together while a predetermined load is applied in the arranging direction. Insulating filler (25) is inserted into a gap between the electrode body (30) and an inside wall surface of the container (14) of at least one of the unit cells (12), and a thickness in the arranging direction of each of the unit cells (12) in the fastened state is constant.

20 Claims, 3 Drawing Sheets

U.S. PATENT DOCUMENTS

| | | | |
|---|---|---|---|
| 2003/0170535 A1* | 9/2003 | Watanabe et al. | 429/158 |
| 2004/0038125 A1 | 2/2004 | Kim et al. | |
| 2005/0058892 A1 | 3/2005 | Ovshinsky et al. | |
| 2005/0069777 A1 | 3/2005 | Takami et al. | |
| 2005/0174092 A1 | 8/2005 | Dougherty et al. | |
| 2006/0024568 A1 | 2/2006 | Lee | |
| 2006/0222939 A1 | 10/2006 | Aamodt et al. | |

FOREIGN PATENT DOCUMENTS

| | | |
|---|---|---|
| JP | 2001-57196 | 2/2001 |
| JP | 2001-167745 | 6/2001 |
| JP | 2001-319677 | 11/2001 |
| JP | 2004-227788 | 8/2004 |
| JP | 2004-259485 | 9/2004 |

OTHER PUBLICATIONS

Office Action (Decision of Refusal) issued Sep. 17, 2009, in Japanese Appln. No. 2006-287646.

Text of Second Office Action from the Chinese Patent Office for Chinese Patent Appl. No. 200780038912.6.

* cited by examiner

25

25

ASSEMBLED BATTERY, MANUFACTURING METHOD OF THE SAME, AND VEHICLE PROVIDED WITH ASSEMBLED BATTERY

CROSS-REFERENCE TO RELATED APPLICATIONS

This application is a national phase application of International Application No. PCT/IB2007/003170, filed Oct. 23, 2007, and claims the priority of Japanese Application No. 2006-287646, filed Oct. 23, 2006, the contents of both of which are incorporated herein by reference.

BACKGROUND OF THE INVENTION

1. Field of the Invention

The invention relates to an assembled battery in which a plurality of rechargeable unit cells are connected in series, a manufacturing method of this assembled battery, and a vehicle provided with this assembled battery.

2. Description of the Related Art

An assembled battery, which is formed by connecting a plurality of unit cells which may be lithium ion batteries (cells) (in this specification, the terms "battery" and "cell" have the same meaning and may be used interchangeably) which are light and are capable of obtaining high energy density, nickel-metal hydride batteries, other secondary batteries, or power storing elements such as capacitors, together in series, is a power source from which high output can be obtained. For this reason, assembled batteries are gaining importance as in-vehicle power sources or power sources for personal computers and portable terminals. Japanese Patent Application Publication No. 2001-57196 (JP-A-2001-57196), for example, describes one example of an in-vehicle assembled battery that is formed by arranging a plurality of individual nickel-metal hydride secondary batteries of the same shape and connecting a positive terminal and a negative terminal provided on each unit cell in series. Also, assembled batteries in which a plurality of lithium ion batteries, which are lightweight and can deliver high energy density, are connected together in series are preferable for use as in-vehicle high-output power sources.

However, it is given that assembled batteries which are mounted in a vehicle such as an automobile are subject to limitations with respect to mounting space and will be used in an environment where vibrations occur. Therefore, as described in JP-A-2001-57196, the assembled battery is constructed with multiple unit cells arranged and fastened together (i.e., each unit cell is fixed to another). When fastening the unit cells together, a substantial load is applied to the individual unit cells which together form the assembled battery. On the other hand, the assembled batteries themselves must be lightweight, particularly if they are to be used in vehicles. Therefore, it is desirable that the container main body of the unit cell (i.e., the outer case that houses the electrode body and the electrolyte) also be lightweight. For example, it is preferable to use a container made of thin metal or synthetic resin. However, a container made of such a thin material tends to deform under an external load. That is, when unit cells provided with such containers are used and a plurality of these unit cells are arranged and fastened together in the direction in which they are arranged (i.e., the arranging direction), the container main body of the unit cells tends to flex or deform in the direction in which the load is being applied. This deformation of the container main body causes deviation and variation in the distance between, and the relative positions of, the positive and negative electrode terminals to be connected in series provided on each unit cell with respect to the ideal values of the initial design. Such variation in the distance between, and the relative positions of, the positive and negative electrode terminals when the unit cells are fastened together may render the terminal connectors, which were manufactured to the shape and size corresponding to the ideal values, unusable for example. Thus, an increase in cost and a decrease in work efficiency related to the work of connecting the positive and negative electrode terminals may result. Moreover, deformation of the unit cell containers that occurs when the unit cells are fastened together may result in the containers and electrode bodies of the unit cells no longer being sealed (air-tight) (i.e., the seal (air-tightness) may be lost).

SUMMARY OF THE INVENTION

This invention thus provides an assembled battery which evens out the shape of unit cells that form the assembled battery, particularly the thickness (size) in a predetermined arranging direction of the unit cells while they are fastened with a load applied in the arranging direction, and thus minimize, in advance, variation in distance between, and relative positions of, the unit cells, or more specifically, positive and negative electrode terminals for connecting the unit cells together in series. The invention also provides a method for manufacturing that assembled battery and a vehicle provided with that assembled battery.

A first aspect of the invention relates to an assembled battery that includes a plurality of rechargeable unit cells, each of which is provided with an electrode body that has a positive electrode and a negative electrode, a container that houses the electrode body and an electrolyte, and a positive electrode terminal and a negative electrode terminal which are arranged on an outside of the container, the rechargeable unit cells being connected in series. The plurality of unit cells are arranged in a predetermined direction and fastened together while a predetermined load is applied in the arranging direction. Insulating filler is inserted into a gap between the electrode body and an inside wall surface of the container of at least one of the unit cells, and a thickness in the arranging direction of each of the unit cells in the fastened state is constant.

Also, the filler may be sheet-shaped having a predetermined thickness, and at least one of the sheet-shaped fillers is inserted into the gap between the electrode body and the inside wall surface of the container of at least one of the unit cells.

Also, the positive electrode and the negative electrode may each be sheet-shaped, and a flat wound electrode body formed by the sheet-shaped positive electrode and the sheet-shaped negative electrode being wound may be provided in each of the plurality of unit cells. The plurality of unit cells may be arranged such that flat surfaces of the wound electrode bodies face each other, and at least one of the sheet-shaped fillers may be inserted into a gap between the flat surface of the wound electrode body and the inside wall surface of the container of at least one of the unit cells.

In this case, the predetermined thickness of the sheet-shaped filler may be 10 to 1000 μm, inclusive. Furthermore, the predetermined thickness of the sheet-shaped filler may be 100 to 200 μm, inclusive.

Incidentally, the filler may be a plurality of long, thin rod-shaped bodies that are arranged in a line.

Also, the positive electrode and the negative electrode may each be sheet-shaped, and the electrode body may be formed by the sheet-shaped positive electrode and the sheet-shaped negative electrode being laminated alternately with a separator.

Spacing plates that are fastened together with the plurality of unit cells while the load is being applied in the arranging direction may be arranged between the plurality of unit cells.

The filler may be made of a polyolefin resin.

The unit cells may be lithium ion cells.

A second aspect of the invention relates to a vehicle provided with the assembled battery described above.

A third aspect of the invention relates to an assembled battery manufacturing method includes: a) constructing a plurality of rechargeable unit cells, each of which is provided with an electrode body that has a positive electrode and a negative electrode, a container that houses the electrode body and an electrolyte, and a positive electrode terminal and a negative electrode terminal which are arranged on an outside of the container; b) arranging the plurality of unit cells in a predetermined direction; c) fastening the plurality of unit cells together while a load is applied in the arranging direction; and d) connecting the plurality of unit cells together in series. Step a) further includes inserting insulating filler into a gap between the electrode body and an inside wall surface of the container of at least one of the unit cells, and making a thickness in the arranging direction of each of the unit cells in the fastened state constant.

BRIEF DESCRIPTION OF THE DRAWINGS

The foregoing and further objects, features and advantages of the invention will become apparent from the following description of example, embodiments with reference to the accompanying drawings, wherein like numerals are used to represent like elements and wherein.

DETAILED DESCRIPTION OF THE EMBODIMENTS

Figure 6:
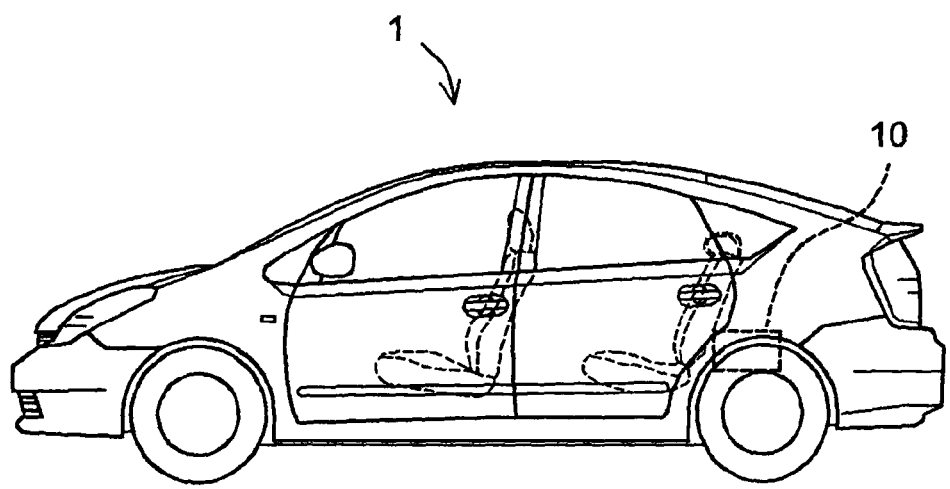
FIG. 6 is a side view showing a frame format of a vehicle provided with the assembled battery according to the example embodiment of the invention.

In the following description and the accompanying drawings, the present invention will be described in more detail in terms of example embodiments. An assembled battery 10 according to the invention is able to be used as an electric motor power source that is mounted in a vehicle such as an automobile, in particular. Therefore, the invention also provides a vehicle (i.e., particularly a vehicle provided with an electric motor, such as a hybrid vehicle, an electric vehicle, or a fuel cell vehicle) 1 provided with this assembled battery 10, as shown in frame format in FIG. 6. In this specification, the term "unit cell" refers to an individual power storing element that can be connected to another individual power storing element (i.e., unit cell) in series to form an assembled battery.

The assembled battery of the invention may be formed by connecting a plurality of individual rechargeable secondary batteries, which serve as the unit cells, together in series. However, the assembled battery of invention is not limited to this unit cell structure. The unit cell structure necessary to carry out the invention may be that of a lithium ion battery, a nickel-metal hydride battery, or an electrical double layer capacitors or the like. Lithium ion batteries make good high performance assembled batteries, particularly in-vehicle assembled batteries (i.e., battery modules) because they are secondary batteries capable of high output with a high energy density. Hereinafter, the invention will be described in detail using an example in which the cell structure is that of a lithium ion battery (cell).

Figure 1:
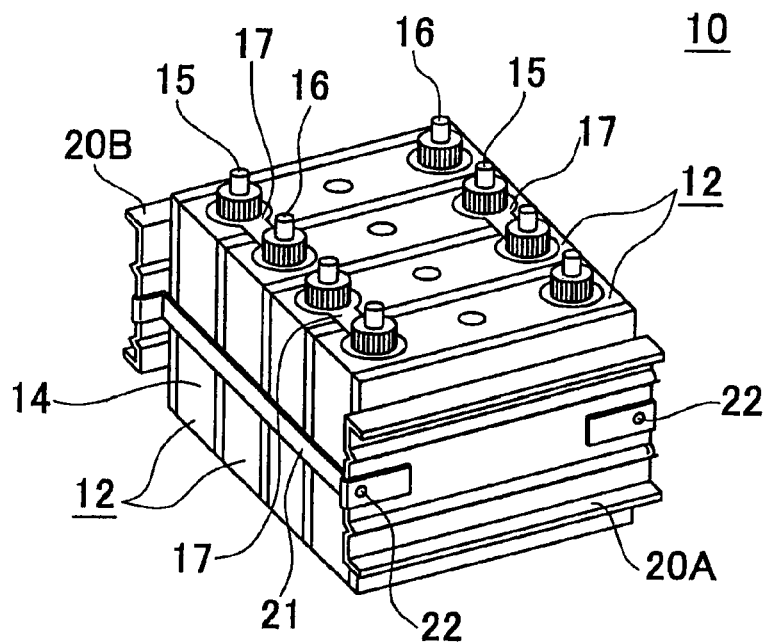
FIG. 1 is a perspective view showing a frame format of the structure of an assembled battery according to one example embodiment of the invention.
Figure 2:
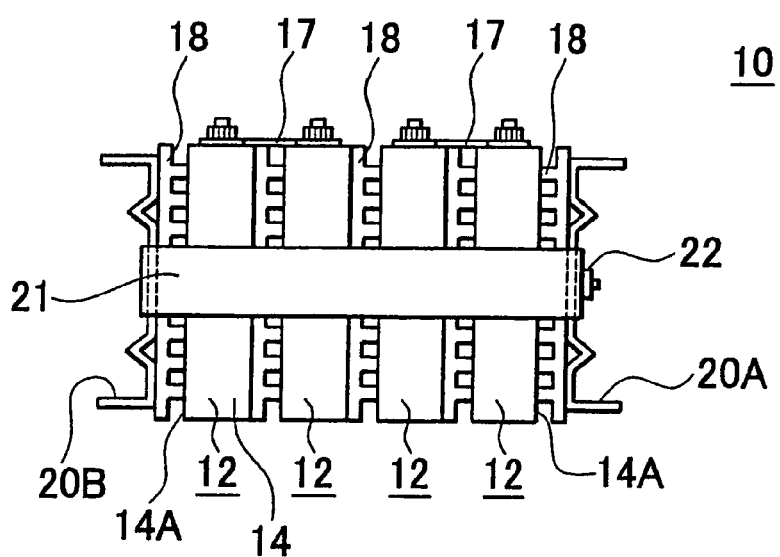
FIG. 2 is a side view showing a frame format of the structure of the assembled battery according the example embodiment.

A unit cell that makes up part of an assembled battery includes an electrode body formed of predetermined cell structure material (i.e., active material of positive and negative electrodes, collectors of the positive and negative electrodes, separators, etc.) and a container which houses the electrode body and the appropriate electrolyte. As an example, the assembled battery 10 described here includes a plurality of unit cells 12, as shown in FIGS. 1 and 2 (in this example embodiment, four unit cells are shown in the drawings). Each unit cell 12 includes a container 14 that is shaped (e.g., box-shaped) so as to be able to house a flat wound electrode body which will be described later. On the container 14 are formed a positive electrode terminal 15 that electrically connects to a positive electrode of the wound electrode body, and a negative electrode terminal 16 that electrically connects to a negative electrode of the wound electrode body. As shown in FIG. 1, the positive electrode terminal 15 of one unit cell 12 is electrically connected to the negative electrode terminal 16 of an adjacent unit cell 12. An assembled battery 10 of the desired voltage is thus constructed by connecting unit cells 12 together in series in this way. Incidentally, safety valves and the like, not shown, for allowing gas produced inside the containers to escape may also be provided in these containers 14. A detailed description of the structure itself of the container 14 will be omitted.

The material of the container 14 is not particularly limited but is relatively lightweight and may deform from a load applied when the unit cells 12 are fastened together. For example, a metal container coated with an insulating resin coating, or a polyolefin resin such as polypropylene or other synthetic resin container may be used. Alternatively, the container may be a resin film container such as a laminated film container having a three layer construction, i.e., an outer (protective) layer made of a high-melting point resin (such as polyethylene terephthalate, polytetrafluoroethylene, or polyimide resin), a barrier layer (i.e., a layer that can block gas and moisture) made of metallic foil (such as aluminum or steel), and an adhesive layer made of a thermal adhesive resin (i.e., a resin with a relatively low melting point such as a polyolefin resin such as ethylene-vinyl acetate or polyethylene or polypropylene). Incidentally, in this example embodiment, a flexible container 14 made of polypropylene will be described.

As shown in FIGS. 1 and 2, a plurality of the same shaped unit cells 12 are arranged in a direction such that wide surfaces 14A of the containers 14 (i.e., the surfaces corresponding to the flat surfaces of the wound electrode bodies 30, which will be described later, that are housed in the containers 14) face one another, with each unit cell 12 being reversed with respect to the adjacent unit cell 12 such that the positive electrode terminals 15 and the negative electrode terminals 16 are arranged alternately at constant intervals. Furthermore, spacing plates (such as spacers) 18 of a predetermined shape are arranged close to the wide surfaces 14A of the containers 14 between the thus arranged unit cells 12 and on both outside ends in the direction in which the unit cells 12 are arranged (i.e., the arranging direction). These spacing plates 18 may be of a material or shape that enables them to function as heat-radiating members for dissipating heat generated inside the unit cells during use. For example, good heat conductive metal spacing plates or lightweight, hard polypropylene or other synthetic resin spacing plates may be used. Also, the spacing plates 18 may be made of thin metal or synthetic resin and be shaped like a frame (e.g., a concavo-convex shape when viewed from the side) that can introduce a cooling fluid (such as air) between the unit cells 12, as shown in FIG. 2.

Then, as shown in FIGS. 1 and 2, fastening members according to the example embodiment are arranged around the thus arranged unit cells 12 and the spacing plates 18 (hereinafter, these will collectively be referred to as a "unit cell group"). That is, as shown in FIGS. 1 and 2, a pair of fastening plates 20A and 20B are arranged on the outside of and in close contact with the outside of the spacing plates 18' which are arranged on the both outside ends of the unit cell group. Also, a fastening beam member 21 is attached to both end surfaces of the unit cell group so as to cross-link the pair of fastening plates 20A and 20B. Accordingly, as shown in FIG. 2, the unit cell group can be fastened by fastening and fixing the end portions of the beam members 21 to the fastening plates 20A and 20B with screws 22 such that a predetermined load (e.g., the surface pressure on the wall surfaces of the container 14 is approximately $2 \times 10^6$ to $5 \times 10^6$ Pa) is applied in the arranging direction.

At this time, a fastening load (surface pressure) that corresponds to how tight the beam members 21 are is applied in the fastening direction (i.e., the arranging direction) to the container wide surface 14A of each unit cell 12. Incidentally, in this example embodiment, the spacing plates 18 are closely arranged between adjacent unit cells 12 so pressure (i.e., a load) is applied by the spacing plates 18 to the portions of the wide surfaces 14A of the unit cell containers 14 that contact the spacing plates 18 when the unit cells 12 are fastened together. As described above, the containers 14 in this example embodiment are flexible so they may deform depending on the load. In particular, when there is a gap between the container main body and the electrode body inside the container 14, the container 14 may deform (i.e., flex) greatly.

Figure 3:
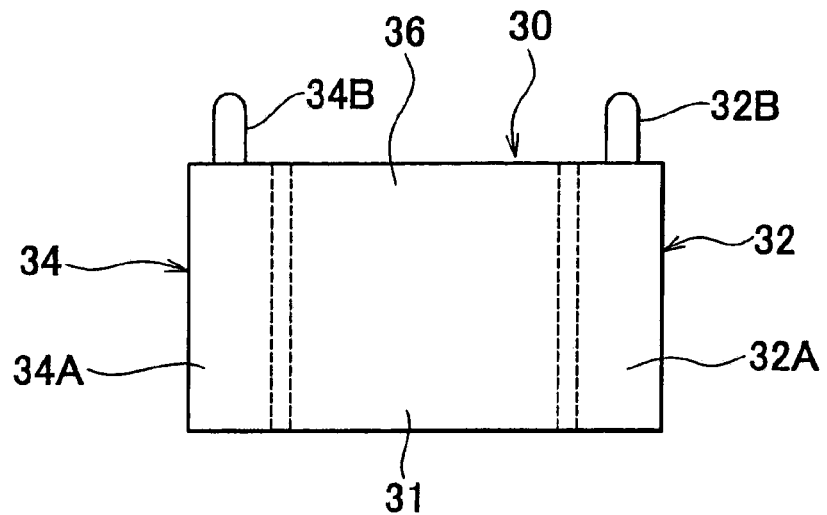
FIG. 3 is a front view showing a frame format of an example of a wound electrode body.
Figure 4:
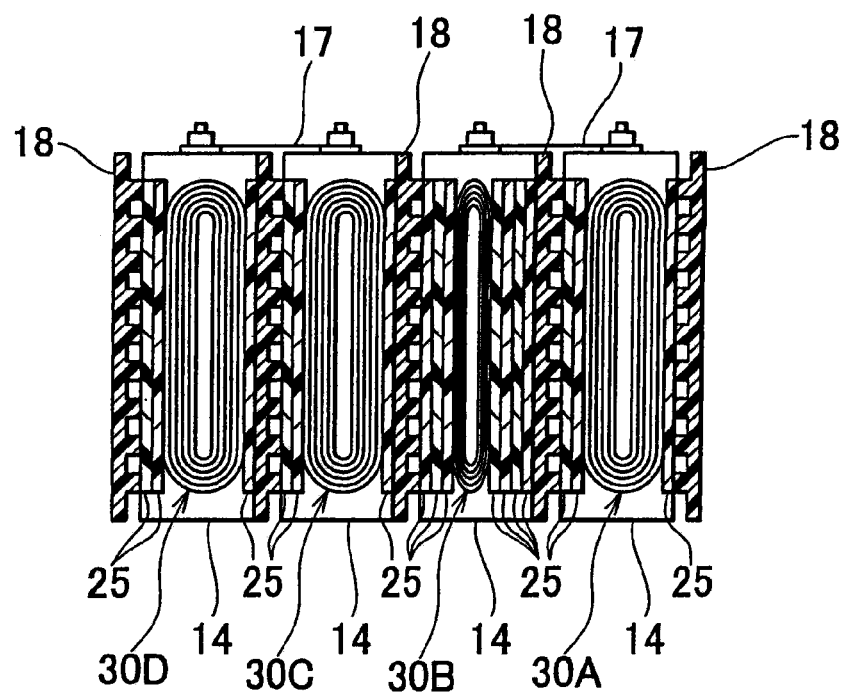
FIG. 4 is a sectional view showing a frame format of the states inside the containers of the unit cells in the fastened state shown in FIG. 2.

Next, the structure in the container 14 of the unit cell 12 according to this example embodiment of the invention, as well as the construction of the unit cell 12 will be described in detail with reference to the drawings. Incidentally, FIG. 3 is a front view showing the wound electrode body 30 housed in the container 14 as viewed from the wide flat side. FIG. 4 is a sectional view showing a frame format of the states inside the containers 14 of the unit cells 12 in the fastened state shown in FIG. 2. As shown in FIG. 3, the wound electrode body 30 in this example embodiment is such that a sheet-shaped positive electrode 32 (hereinafter referred to as a "positive electrode sheet 32") and a sheet-shaped negative electrode 34 (hereinafter referred to as a "negative electrode sheet 34") are laminated with two sheet-shaped separators 36 (each of which will hereinafter be referred to simply as a "separator sheet 36"). Further, the flat wound electrode body 30 is made by winding the positive electrode sheet 32 and the negative electrode sheet 34 somewhat offset from one another, and then squashing the resultant wound body from the sides.

As shown in FIG. 3, portions of the ends of the positive electrode sheet 32 and the negative electrode sheet 34 of the wound electrode body 30 protrude out from a wound core portion 31 (i.e., a portion where a positive electrode active material layer forming portion of the positive electrode sheet 32, a negative electrode active material layer forming portion of the negative electrode sheet 34, and the separator sheet 36 are closely wound). A positive electrode lead terminal 32B is formed on a positive electrode side protruding portion (i.e., the portion where the positive electrode active material layer is not formed) 32A, and a negative electrode lead terminal 34B is formed on a negative electrode side protruding portion (i.e., the portion where the negative electrode active material layer is not formed) 34A. The positive electrode terminal 15 described above is electrically connected to the positive electrode lead terminal 32B, and the negative electrode terminal 16 described above is electrically connected to the negative electrode lead terminal 34B.

Incidentally, the material and member itself of which the wound electrode body 30 is formed is not particularly limited. For example, the positive electrode sheet 32 may be formed with a positive electrode active material layer for a lithium ion battery applied to a long positive electrode collector. Aluminum foil (in this example embodiment) or another metallic foil suitable for use as a positive electrode may be used for the positive electrode collector. Similar to the material used in normal lithium ion batteries, $LiMn_2O_4$, $LiCoO_2$, or $LiNiO_2$, for example, may be used as the positive electrode active material. For example, the positive electrode sheet 32 may be obtained by using aluminum foil approximately 2 to 4 m (e.g., 2.7 m) long, 8 to 12 cm (e.g., 10 cm) wide, and 5 to 20 μm thick (e.g., 15 μm) as the collector and forming a positive electrode active material layer for a lithium ion battery with lithium nickel oxide as the main component (e.g., 88 percent by mass of lithium nickel oxide, 10 percent by mass of acetylene black, 1 percent by mass of polytetrafluoroethylene, and 1 percent by mass of carboxymethyl cellulose) according to an ordinary method on a predetermined region of the surface.

Meanwhile, the negative electrode sheet 34 may be formed with a negative electrode active material layer for a lithium ion cell applied to a long negative electrode collector. Copper foil (in this example embodiment) or another metallic foil suitable for use as a negative electrode may be used as the negative electrode collector. Similar to the material used in normal lithium ion batteries, a carbon-based material such as graphite carbon or amorphous carbon, or a lithium containing transition metal oxide or transition metal nitride may be used as the negative electrode active material. For example, the negative electrode sheet 34 may be obtained by using copper foil approximately 2 to 4 m (e.g., 2.9 m) long, 8 to 12 cm (e.g., 10 cm) wide, and 5 to 20 μm thick (e.g., 10 μm) and forming a negative electrode active material layer for a lithium ion battery with graphite as the main component (e.g., 98 percent by mass of graphite, 1 percent by mass of styrene-butadiene rubber, and 1 percent by mass of carboxymethyl cellulose) according to an ordinary method on a predetermined region of the surface. Also, the separator sheet 36 that is used between the positive electrode sheet 32 and the negative electrode sheet 34 can be formed of a porous polyolefin resin. For example, a synthetic resin (for example, a polyolefin such as polyethylene) porous separator sheet 2 to 4 m (e.g., 3.1 m) long, 8 to 12 cm (e.g., 11 cm) wide, and 5 to 30 μm (e.g., 25 μm) thick can be used. Incidentally, when the electrolyte used is a solid electrolyte or a gel electrolyte, the separator may not be needed. That is, in this case, the electrolyte itself can function as a separator.

Figure 5A:
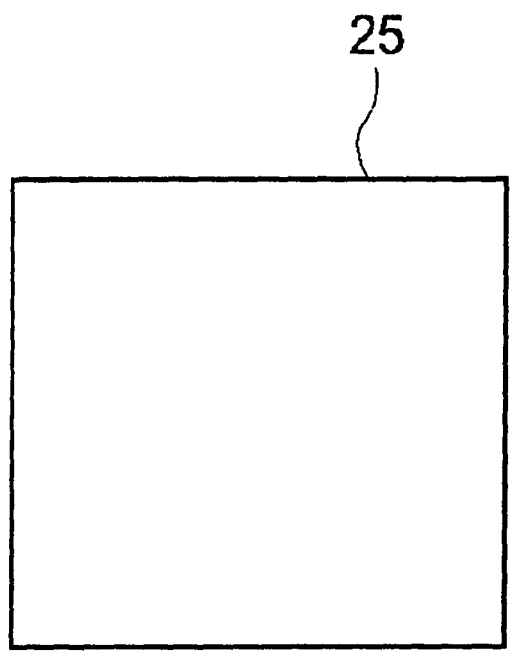
FIG. 5A is a front view showing a frame format of an example of a sheet-shaped filler that can be inserted into the unit cell container of the assembled battery according to the example embodiment.
Figure 5B:
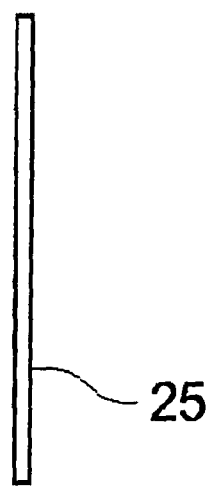
FIG. 5B is a side view of the sheet-shaped filler shown in FIG. 5A.

Next, the resultant flat wound electrode bodies 30A, 30B, 30C, and 30D are housed inside the containers 14 of the unit cells 12. At this time, the thicknesses of the wound electrode bodies 30A to 30D tend to become uneven depending on the state and extent of the winding, as shown in FIG. 4. Therefore, the dimensions of the gaps in the containers 14 of the unit cells 12 (i.e., the difference between the dimensions in the thickness direction (i.e., the arranging direction) of the space inside the containers 14 and the thickness of the electrode bodies 30A to 30D in that direction) may all be different depending on the wound electrode bodies 30A to 30D. Here, in this example embodiment, the gaps in the containers 14 of the unit cells 12 are able to be closed by using a thin sheet-shaped insulating filler 25 (hereinafter simply referred to as a "filler sheet 25"), as shown in FIG. 5B. More specifically, the filler sheet 25 used can be made of a polyolefin resin, such as polypropylene, and have a thickness of equal to or less than 1 mm (e.g., 10 to 1000 µm, and preferably 100 to 200 µm).

That is, as shown in FIG. 4, the gaps in the containers 14 of the unit cells 12 are closed by inserting into them the appropriate number of filler sheets 25 for the sizes of the gaps. In the example shown in FIG. 4, there are between one and four filler sheets 25 according to the size of the gap in each of the unit cells 12. Employing the filler sheets 25 of the same shape in this way enables gaps of varying sizes in the unit cell containers 14 to be filled efficiently. As described above, using the filler (i.e., the filler sheet 25) eliminates the gaps in the unit cell containers 14 that may deform during fastening such that the thickness in the arranging direction (i.e., the direction in which the fastening load is applied) of the unit cells 12 is uniform. As a result, a highly reliable assembled battery having the correct shape can be manufactured.

In particular, the positive and negative electrode terminals 15 and 16 of adjacent unit cells 12 can be connected one after another using single connectors 17, as shown in FIG. 1, because the correct preset dimensions of the positive and negative electrode terminals 15 and 16, and the correct preset relative positions of those terminals, between two unit cells 12 that are adjacent to one another in the arranging direction can be ensured. Therefore, the assembled battery 10 can be manufactured efficiently without having to perform troublesome work such as measuring the distances between the terminals 15 and 16 of adjacent individual unit cells 12 and then selecting connectors that correspond to those distances, and adjusting the distance between two positive and negative electrode terminal connecting portions using connectors that allow that distance to be adjusted.

When inserting a plurality of filler sheets 25, at least one filler sheet 25 may be inserted on both sides of the electrode bodies 30A to 30D such that the electrode bodies 30A to 30D do not contact the inside wall surfaces of the containers 14. When a filler is arranged on both sides of the electrode bodies 30A to 30D in this way, it acts as a buffer wall or barrier that protects the surface of the electrode body from deforming. That is, even if the wall surface of the container 14 were to deform when the plurality of unit cells 12 are fastened together in the arranging direction (i.e., even if the wall surface of the container main body were to deform in a corrugated shape due to pressure being exerted on certain areas by the convex portions of the spacer plate 18 as shown in FIG. 4, for example), the filler would prevent the surface of the electrode body from deforming in a manner that reflects (copies) that deformation (i.e., prevent parts of the electrode surface from deforming in a corrugated or curved shape that reflects the corrugated shape of the deformed container main body wall surface, for example). Therefore, according to this example embodiment of the invention, it is possible to prevent deformation of an electrode body that is included in each of a plurality of rechargeable unit cells that are fastened in a predetermined arranging direction in order to form the assembled battery. That is, fillers that are described herein are used as buffer wall material and inserted between the electrode body (such as the wound electrode body) and the container main body in the container of each unit cell. As a result, it is possible to prevent the electrodes that are housed in containers of a plurality of unit cells which are arranged in a predetermined direction from deforming when fastening the unit cells together while a load is being applied in the arranging direction.

The unit cells 12 of this example embodiment are constructed by inserting the wound electrode bodies 30A to 30D together with an appropriate number of the filler sheets 25 into the containers 14, injecting a non-aqueous electrolyte solution such as a mixed solution (e.g., mass ratio 1:1) of ethyl carbonate and ethylene carbonate that includes a predetermined amount (e.g., concentration of 1 M) of an electrolyte (e.g., a lithium salt such as $LiPF_6$), and sealing them. The obtained unit cells 12 are then arranged in a predetermined direction and the unit cell group is fastened together in that arranging direction as described above. As described above, in the assembled battery 10 of this example embodiment, deformation does not occur in the fastened unit cells 12 so the loss of seal (air-tightness) of the unit cell containers that may occur as a result of such deformation will not occur. Moreover, the gaps between the inside wall surfaces of the containers 14 and the wound electrode bodies 30A to 30D are closed by the fillers 25. Accordingly, it is possible to prevent any adverse effects that these gaps may have on battery performance, such as localized degradation of the electrode active material or unevenness of current distribution due to the electrode active material being unevenly distributed when the electrode bodies 30A to 30D are tilted, for example. As a result, the assembled battery 10 of this example embodiment can be used in a vehicle as well as for other applications.

Heretofore, an example embodiment of an assembled battery manufacturing method, as well as an assembled battery which can be manufactured according to that method according to the invention are described in detail. However, the invention is not limited to the manufacturing method and assembled battery described in that example embodiment. For example, in the foregoing example embodiment, a sheet-shaped filler is employed, but the invention is not limited to this. For example, multiple long, thin, rod-shaped or cylindrical fillers may also be inserted, densely arranged in a line, into the gaps in the containers. Also, the electrode body housed in the container of the unit cell is not limited to being wound. For example, it may be a laminated electrode body in which a positive electrode sheet and a negative electrode sheet are laminated alternately with a separator (or a solid or gel electrolyte). Further, the unit cell is not limited to being a lithium ion cell (battery) as described above. That is, the unit cell may instead by any one of a variety of cells with different electrolyte body structure material and electrolytes. For example, it may be a lithium secondary cell in which lithium metal or a lithium alloy serves as the negative electrode, a nickel-metal hydride cell, a nickel-cadmium cell, or an electrical double layer capacitor. Also, although the structure of the assembled battery 10 shown in FIG. 1 has been simplified for the purpose of describing the invention, one skilled in the art will understand that various modifications and additions are possible insofar as the structure and effect of the invention is not lost. For example, when mounting the assembled battery in a vehicle such as an automobile, more unit cells can be connected in series, an outer cover can be provided to protect the main parts (i.e., the unit cell group, etc.) of the assembled battery, and parts for connecting a plurality of assembled batteries (i.e., battery modules) together and the like can be provided. However, the presence or absence thereof does not affect the technical scope of the invention.

The invention claimed is:

1. An assembled battery comprising:
a plurality of rechargeable unit cells, which are connected together in series, each of the plurality of rechargeable unit cells including:
an electrode body that has a positive electrode and a negative electrode;
a container that houses the electrode body and an electrolyte; and
a positive electrode terminal and a negative electrode terminal which are arranged on an outside of the container,
wherein the plurality of unit cells is arranged in a predetermined direction and fastened together while a predetermined load is applied in the arranging direction,
wherein a gap between the electrode body and an inside wall surface of the container of a first one of the unit cells is eliminated by inserting a first number of insulating fillers so that a thickness in the arranging direction of each of the unit cells in the fastened state is constant, and
wherein a gap between the electrode body and an inside wall surface of the container of a second one of the unit cells is eliminated by inserting a second number of insulating fillers different from the first number so that the thickness in the arranging direction of each of the unit cells in the fastened state is constant.

2. The assembled battery according to claim 1, wherein at least one of the insulating fillers is sheet-shaped and has a predetermined thickness.

3. The assembled battery according to claim 2, wherein the positive electrode and the negative electrode are each sheet-shaped; a flat wound electrode body formed by the sheet-shaped positive electrode and the sheet-shaped negative electrode being wound is provided in each of the plurality of unit cells; the plurality of unit cells are arranged such that flat surfaces of the wound electrode bodies face each other; and at least one of the sheet-shaped fillers is inserted into a gap between the flat surface of the wound electrode body and the inside wall surface of the container of at least one of the unit cells.

4. The assembled battery according to claim 2, wherein the predetermined thickness is 10 to 1000 μm, inclusive.

5. The assembled battery according to claim 4, wherein the predetermined thickness is 100 to 200 μm, inclusive.

6. The assembled battery according to claim 1, wherein at least one of the insulating fillers is a plurality of long, thin rod-shaped bodies that are arranged in a line.

7. The assembled battery according to claim 1, wherein the positive electrode and the negative electrode are each sheet-shaped; and the electrode body is formed by the sheet-shaped positive electrode and the sheet-shaped negative electrode being laminated alternately with a separator.

8. The assembled battery according to claim 1, wherein spacing plates that are fastened together with the plurality of unit cells while the load is being applied in the arranging direction are arranged between the plurality of unit cells.

9. The assembled battery according to claim 1, wherein at least one of the insulating fillers is made of a polyolefin resin.

10. The assembled battery according to claim 1, wherein the unit cells are lithium ion cells.

11. A vehicle provided with the assembled battery according to claim 1.

12. An assembled battery manufacturing method comprising:
a) constructing a plurality of rechargeable unit cells, each of which is provided with an electrode body that has a positive electrode and a negative electrode, a container that houses the electrode body and an electrolyte, and a positive electrode terminal and a negative electrode terminal which are arranged on an outside of the container;
b) arranging the plurality of unit cells in a predetermined direction;
c) fastening the plurality of unit cells together while a load is applied in the arranging direction; and
d) connecting the plurality of unit cells together in series, wherein step a) further includes:
eliminating a gap between the electrode body and an inside wall surface of the container of a first one of the unit cells by inserting a first number of insulating fillers so as to make a thickness in the arranging direction of each of the unit cells in the fastened state constant; and
eliminating a gag between the electrode body and an inside wall surface of the container of a second one of the unit cells by inserting a second number of insulating fillers different from the first number so as to make the thickness in the arranging direction of each of the unit cells in the fastened state constant.

13. The assembled battery according to claim 2, wherein spacing plates that are fastened together with the plurality of unit cells while the load is being applied in the arranging direction are arranged between the plurality of unit cells.

14. The assembled battery according to claim 3, wherein spacing plates that are fastened together with the plurality of unit cells while the load is being applied in the arranging direction are arranged between the plurality of unit cells.

15. The assembled battery according to claim 2, wherein the at least one of the insulating fillers is made of a polyolefin resin.

16. The assembled battery according to claim 3, wherein the at least one of the insulating fillers is made of a polyolefin resin.

17. The assembled battery according to claim 2, wherein the unit cells are lithium ion cells.

18. The assembled battery according to claim 3, wherein the unit cells are lithium ion cells.

19. A vehicle provided with the assembled battery according to claim 2.

20. A vehicle provided with the assembled battery according to claim 3.

* * * * *